United States Patent
Shastri et al.

(10) Patent No.: US 7,259,729 B2
(45) Date of Patent: Aug. 21, 2007

(54) IMAGE DISPLAY METHOD, APPARATUS AND STORAGE MEDIUM

(75) Inventors: Kaushal Shastri, Stamford, CT (US); Mark Schuurmans, Grand Rapids, MI (US)

(73) Assignee: Fujifilm Corporation, Tokyo (JP)

( * ) Notice: Subject to any disclaimer, the term of this patent is extended or adjusted under 35 U.S.C. 154(b) by 433 days.

(21) Appl. No.: 09/774,877

(22) Filed: Feb. 1, 2001

(65) Prior Publication Data

US 2002/0101436 A1 Aug. 1, 2002

(51) Int. Cl.
*G09G 5/00* (2006.01)
*G06F 15/00* (2006.01)
*G06K 9/00* (2006.01)

(52) U.S. Cl. .................. 345/1.3; 345/1.2; 345/2.1; 715/517; 715/788; 715/855; 382/128; 382/130; 382/305

(58) Field of Classification Search ............. 345/783, 345/788, 789, 792, 424, 619, 156, 520, 1.1–1.3, 345/2.1–2.3; 715/526, 517, 766, 784, 785, 715/788, 790, 794, 817–819, 829, 855; 707/205; 382/132, 128, 130, 305; 600/301
See application file for complete search history.

(56) References Cited

U.S. PATENT DOCUMENTS

| | | | | |
|---|---|---|---|---|
| 4,642,621 A | * | 2/1987 | Nemoto et al. | 345/634 |
| 5,072,412 A | | 12/1991 | Henderson, Jr. et al. | |
| 5,179,651 A | * | 1/1993 | Taaffe et al. | 345/555 |
| 5,452,416 A | * | 9/1995 | Hilton et al. | 395/161 |
| 5,734,915 A | * | 3/1998 | Roewer | 715/512 |
| 5,805,118 A | * | 9/1998 | Mishra et al. | 345/1.1 |
| 5,943,679 A | * | 8/1999 | Niles et al. | 715/526 |
| 5,986,662 A | * | 11/1999 | Argiro et al. | 345/424 |
| 6,081,267 A | * | 6/2000 | Stockham et al. | 715/788 |
| 6,119,133 A | * | 9/2000 | Nusbickel et al. | 707/205 |
| 6,460,040 B1 | * | 10/2002 | Burns | 707/10 |
| 6,574,629 B1 | * | 6/2003 | Cooke, Jr. et al. | 707/10 |

(Continued)

FOREIGN PATENT DOCUMENTS

JP 04-274485 9/1992

(Continued)

OTHER PUBLICATIONS

Sanders, et al., "Design and implementation of a clinical MSI workstation," *Proceedings of the Annual Symposium on Computer Based Medical Systems*, Durham, Jun. 14-17, 1992, New York. IEEE. D, US, vol. Symp. 5, Jun. 14, 1992, pp. 138-146.

(Continued)

*Primary Examiner*—Henry N. Tran
(74) *Attorney, Agent, or Firm*—Sughrue Mion, PLLC

(57) ABSTRACT

A plurality of images, in a layout based on a display protocol, is displayed with high efficiency. Display protocol sequences PS1, PS2 and PS3, in which multiple display protocols are lined up in a predetermined order, are remembered in a memory means of a workstation. The workstation is connected to an image server storing a plurality of image data, and by selecting a desired display protocol sequence and specifying to the image server to transmit image data, the layout is switched based on the display protocol sequence, and the images are laid out, etc. and displayed on a monitor.

23 Claims, 5 Drawing Sheets

U.S. PATENT DOCUMENTS

| | | | |
|---|---|---|---|
| 6,904,161 B1* | 6/2005 | Becker et al. | 382/128 |
| 7,050,611 B2* | 5/2006 | Bodicker et al. | 382/128 |
| 2001/0007593 A1* | 7/2001 | Oosawa | 382/132 |
| 2002/0186212 A1* | 12/2002 | Matsumoto et al. | 345/204 |

FOREIGN PATENT DOCUMENTS

| | | |
|---|---|---|
| WO | WO94/16399 A | 7/1994 |

OTHER PUBLICATIONS

Yongmin et al., "A Next-bases High Performance Image Computing Workstation For Biomedical Applications" *Engineering in Medicine and Biology Society, 1990, Proceedings of the Twelfth Annual International Conference of the IEEE*, Philadelphia PA, USA, Nov. 1-4, 1990, New York, Nov. 1, 1990, pp. 219-220.

Schroeter et al., "An applicatipn interface with multiple workspaces: the context switcher" *Proceedings of the International Conference on Human-Computer Interaction*, Amsterdam, NL, Nov. 24, 1996, pp. 318-319.

"Intuitive Desktop including Navigation Through a Complex Graphical Structure," *IBM Technical Disclosure Bulletin*, IBM Corp., New York, US, vol. 33, No. 11, Apr. 1, 1991, pp. 78-81.

* cited by examiner

FIG. 3A

| A1 | A2 | A3 |
|----|----|----|
| A4 | A5 | A6 |
| A7 | A8 | A9 |

22A

| B1 | B2 | B3 |
|----|----|----|
| B4 | B5 | B6 |
| B7 | B8 | B9 |

| A1 | A2 |
|----|----|
| A3 | A4 |

22A

| B1 | B2 |
|----|----|
| B3 | B4 |

| A1 | A2 |
|----|----|
| A3 | A4 |

22A

| B1 | B2 |
|----|----|

22B

IMAGE DISPLAY METHOD, APPARATUS AND STORAGE MEDIUM

BACKGROUND OF THE INVENTION

1. Field of the Invention

The present invention relates to an image display method, apparatus and storage medium, and more particularly to an image display method wherein a plurality of images are displayed on a CRT, LCD, etc. monitor according to a predetermined display layout, apparatus, and a computer-readable storage medium on which a program that causes a computer to execute the steps of the image processing method.

2. Description of the Related Art

There are in use in the medical field today apparatus (modalities) for forming X-ray and other diagnostic images used in a variety of diagnosis, including CR (computed Radiography) apparatus, CT (Computerized Tomography) apparatus, MRI (Medical Resonance Imagery) apparatus, etc. The image data produced in each modality is displayed on a CRT terminal (hereinafter referred to simply as a CRT), or output by a laser printer, etc. to film, etc. for use by a reader at a medical treatment site in ascertaining the presence or absence of a disease, tissue damage, etc.

In order to make images obtained by such modalities easy to use in diagnosis, it is necessary to display the images on a display means. At any rate, because a plurality of images are obtained in a single examination employing CT apparatus, MRI apparatus, etc., to provide for easy examination of such images it is necessary to line them up. In addition, when employing in diagnosis images obtained by CT apparatus, there are cases for which images acquired in the past are compared to images acquired in the present in a comparative diagnosis, and to facilitate easy performance of such comparison diagnosis it is necessary to line the images up and display them.

To this end, a display protocol is employed for defining the display format in which a plurality of images is to be displayed, and based on this display protocol; the plurality of images is displayed on the display means. The display protocol defines the layout of a plurality of images, the display conditions (for example, in what order images are to be displayed, etc.), the image processing conditions (hereinafter referred to as the layout, etc.); based on the examination, the series, the examining doctor or group of doctors, the place where the images are to be employed, the purpose for which the images are to be used, etc. For example, a given display protocol might be defined so that a screen is divided into four regions in which are displayed: in the upper left region, a front view X-ray image of the chest taken during the current examination; in the lower left region, a front view X-ray image of the chest taken in the past; in the upper right region, a side view X-ray image of the chest taken during the current examination; and in the upper right region, a side view X-ray image of the chest taken in the past. In addition, another display protocol might be defined so that a screen is divided into 9 regions in which a plurality of Tomography images obtained by a CT apparatus are lined up and displayed.

Further, although a display protocol is not employed, a method has been provide wherein each series (by type of examination) of images obtained in an examination employing MRI apparatus is lined up and displayed, and at the same time one series of images is switched, another series of images is also switched (refer to U.S. Pat. No. 5,452,416). According to this method, the examiner of images encounters no impediments in viewing of the images, and multiple series of images can be assigned to correspond to each other and displayed.

As examinations become more complex and the number of images increases, if only one display protocol is defined, it becomes difficult to display the images so that diagnosis can be performed without difficulty. Because of this, a plurality of display protocols is prepared, and the examiner switches the protocols in order, so that the plurality of images is displayed in the desired display layout. However, in this method of switching protocols a great burden is placed on the examiner in that he or she must memorize the type of layout defined by each display protocol. In addition, because it is necessary to specify the display protocol each time the layout is switched, the efficiency of displaying the images is extraordinarily low.

SUMMARY OF THE INVENTION

The present invention has been developed in consideration of the circumstances described above. A main objective of the present invention is to provide an image display method, apparatus and computer readable storage medium on which a program that causes a computer to execute the image display method is recorded, which can display with high efficiency a plurality of images.

In the image display method of the present invention for displaying a plurality of images on a display means, the display layout is switched by switching the display protocols, based on at least one display protocol sequence in which a plurality of display protocols that define a display layout are lined up in a predetermined order, and the plurality of images are displayed on the display means.

The expression "display means" refers to a CRT, LCD, etc monitor for displaying images.

The expression "display protocol" refers to the protocol which defines image layout, image display conditions, image processing conditions, etc., based on an examination, a series, the examining doctor or group of doctors, the place an image will be used and/or the purpose of the image, etc. More specifically, a definition by which a screen is divided into four regions in which are displayed a front view X-ray image of the chest taken during the current examination in the upper left region, a front view X-ray image of the chest taken in the past in the lower left region, a side view X-ray image of the chest taken during the current examination in the upper right region, and a side view X-ray image of the chest taken in the past in the lower right region, or alternatively, a definition by which a screen is divided into 9 regions in which a plurality of Tomography images obtained by a CT apparatus are lined up and displayed, or a definition by which projection images and cross-sectional images obtained by a CT apparatus are lined up and displayed, or a definition by which cross-sectional images obtained by a CT apparatus are able to be switched and displayed, or a definition by which for images T1 and T2 obtained by an MRI apparatus in a special examination mode, a display screen may be divided up and images displayed based on whether or not a contrast medium was used when an image was taken, etc., may be employed as display protocols.

The expression "display protocol sequence" refers to an array of display protocols lined up in a predetermined order. Note that the display protocols in a display protocol sequence are lined up in an order according to the examination, the series, the examining doctor or the group of doctors the examining doctor belongs to, etc.

Moreover, switching of display protocols may be carried out manually or automatically.

Note that there may be only one display protocol sequence. However, for cases in which there are multiple display protocol sequences, it is desirable that it is possible to select one display protocol sequence from said multiple display protocol sequences, and to have the plurality of images displayed on the display means based on the selected display protocol sequence.

In addition, when there are multiple display protocol sequences, they may be switched, and the plurality of images displayed, based on the display protocol sequence switched to, on the display means.

Further, the display protocol sequence can be set in advance, or it can be created based on the predetermined conditions when the images are displayed on the display means.

As the "predetermined conditions", the type of examination, the series, the examining doctor or the group of doctors the examining doctor belongs to, etc. may be employed.

The image display apparatus of the present invention for displaying a plurality of images on a display means is provided with a memory means for remembering at least one display protocol sequence, in which a plurality of display protocols that define a display format are lined up in a predetermined order, and a control means for controlling the switching, based on at least one display protocol sequence, of display layouts by the switching of display protocols.

For cases in which multiple display protocol sequences are remembered by the memory means of the display apparatus of the present invention, an input means is provided for receiving selection of a desired display protocol sequence.

Furthermore, it is desirable that the aforementioned control means, based on the display protocol sequence selected in the input means, displays the plurality of images on the display means.

In addition, that the control means of the display apparatus of the present invention can also switch the multiple display protocol sequences, and based on the display protocol switched to, display the plurality of images is desirable.

Furthermore, that the control means of the image display apparatus according to the present invention creates the display protocol sequence based on the predetermined conditions, and displays the plurality of images on the display means based on the created display protocol sequence is desirable.

Note that image display method of the present invention may be provided as a program that causes a computer to execute the image display method of the present invention recorded on a computer-readable storage medium.

According to the present invention, based on a display protocol sequence in which a plurality of display protocols have been lined up in a predetermined order, the display layout of a plurality of images can be switched; therefore, it is not necessary for the examiner to memorize the display protocols, and the work load of the examiner is thereby reduced.

Further, for cases in which there are multiple display protocol sequences, because a desired display protocol sequence can be selected, the degree of freedom with respect to image display format is raised.

Additionally, for cases in which there is are multiple display protocol sequences, because the display protocol sequence can be switched, the examiner can display the plurality of images according to a desired display protocol sequence.

BRIEF DESCRIPTION OF THE DRAWINGS

FIG. 3A shows examples of display protocols, FIG. 3B shows further examples of display protocols, FIG. 3C shows yet additional examples of display protocols.

DESCRIPTION OF THE PREFERRED EMBODIMENTS

Hereinafter, with reference to the drawings, the preferred embodiments of the present invention will be explained.

Figure 1:
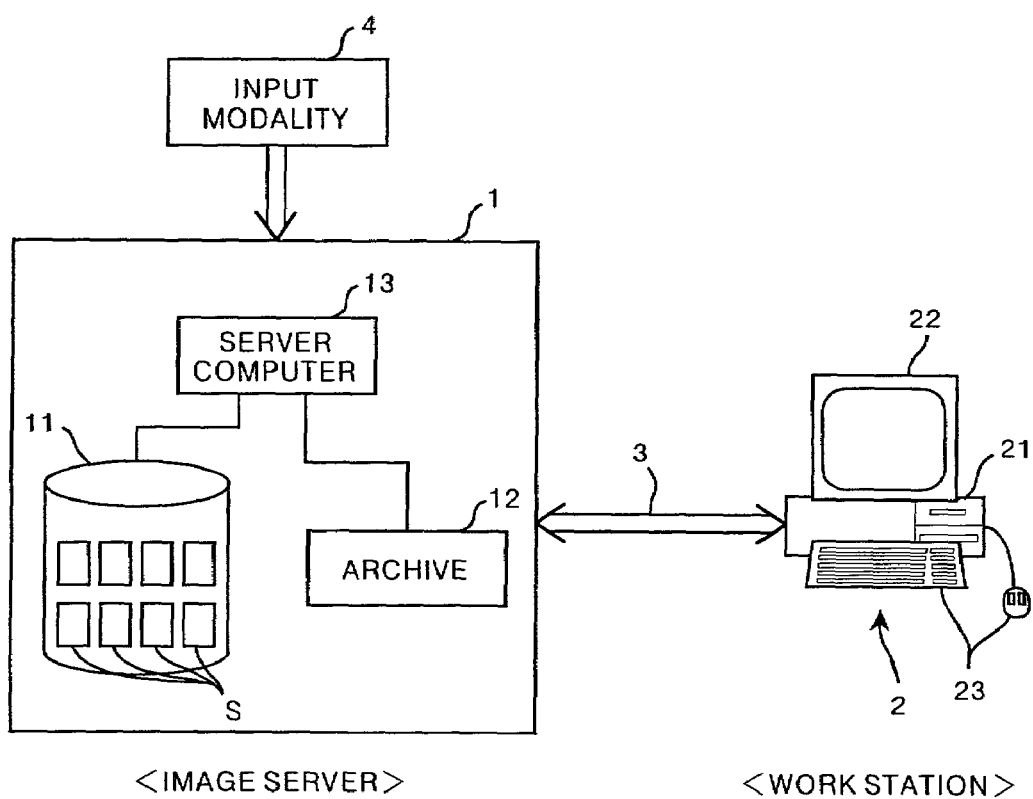
FIG. 1 is a block drawing of the configuration of a medical image network, in which the display apparatus according to a preferred embodiment of the present invention is implemented.

FIG. 1 is a block drawing of the configuration of a medical image network, in which the display apparatus according to a preferred embodiment of the present invention is implemented. As shown in FIG. 1, this medical image network comprises an image server 1 storing image data S and a workstation 2 connected by a network 3. In such a medical image network, workstation 2 accesses image server 1 so as to request server 1 to transmit image data stored in image server 1, or workstation 2 directly reads out image data stored in image server 1, so that images can be displayed at workstation 2 and diagnosis can be performed. Note that in FIG. 1, although only one workstation is shown, multiple workstation 2's are connected to image server 1 by network 3.

Image server 1 is provided with: a temporary storage medium 11, such as a RAID (Redundant Array of Inexpensive Disks), etc. for temporarily storing image data S; an archive disk 12, such as a CD-R, DVD, DLI, etc. for providing semi-permanent storage of image data S after a specified period of time has elapsed; and a server computer 13 for controlling data-compression processing of image data S, data management, data transmission from workstation 2, and various operations and processes of image server 1. Further, image server 1 is connected to an input modality 4 such as CR apparatus, CT apparatus, MRI apparatus, etc., from which it receives formed image data S, which it stores and manages.

Note that, according to the set conditions (after a predetermined period of time elapses after diagnosis by a doctor has been perfonned, for example), image data S is copied from temporary storage medium 11 to archive 12. For example, when said set conditions are satisfied, the exact same image data S as tat stored in temporary storage medium 11 is copied to archive 12, and as the amount of storage space on temporary storage medium 11 becomes unavailable for use, said image data S is deleted from temporary storage medium 11 in the order commencing from the oldest date thereof, whereby said image data S becomes stored exclusively in archive 12. Note that according to the purpose of image data S, it may be compressed and stored in both temporary storage medium 11 and archive 12.

In addition, original image data or original image data that has been compressed and is extractable can he stored in temporary storage medium 11, and when said image data is copied to archive 12 it can be made compressed non-reversibly.

Further, copying data S to archive 12 and deleting data S from temporary storage medium 11 are managed by the database DB, which is not shown in the drawings. Accordingly, if a request for image data S that has been deleted from temporary storage medium 11 is issued by display terminal 2, said image data is read out from archive 12 and transmitted to display terminal 2. In this case, although more time is required for such reading out and transmitting from archive 12, compared to cases in which image data S is transmitted to display terminal 2 from temporary storage medium 11, the image represented by image data S can be displayed by display terminal 2 without recognition of the storage location of said image data S.

Workstation 2 is provided with: a computer 21; a CRT, LCD, etc. monitor 22; and a keyboard, mouse, etc. input means 23. By various input operations of input means 23, image data S can be acquired from image server 1 and images displayed on monitor 22.

Figure 2:
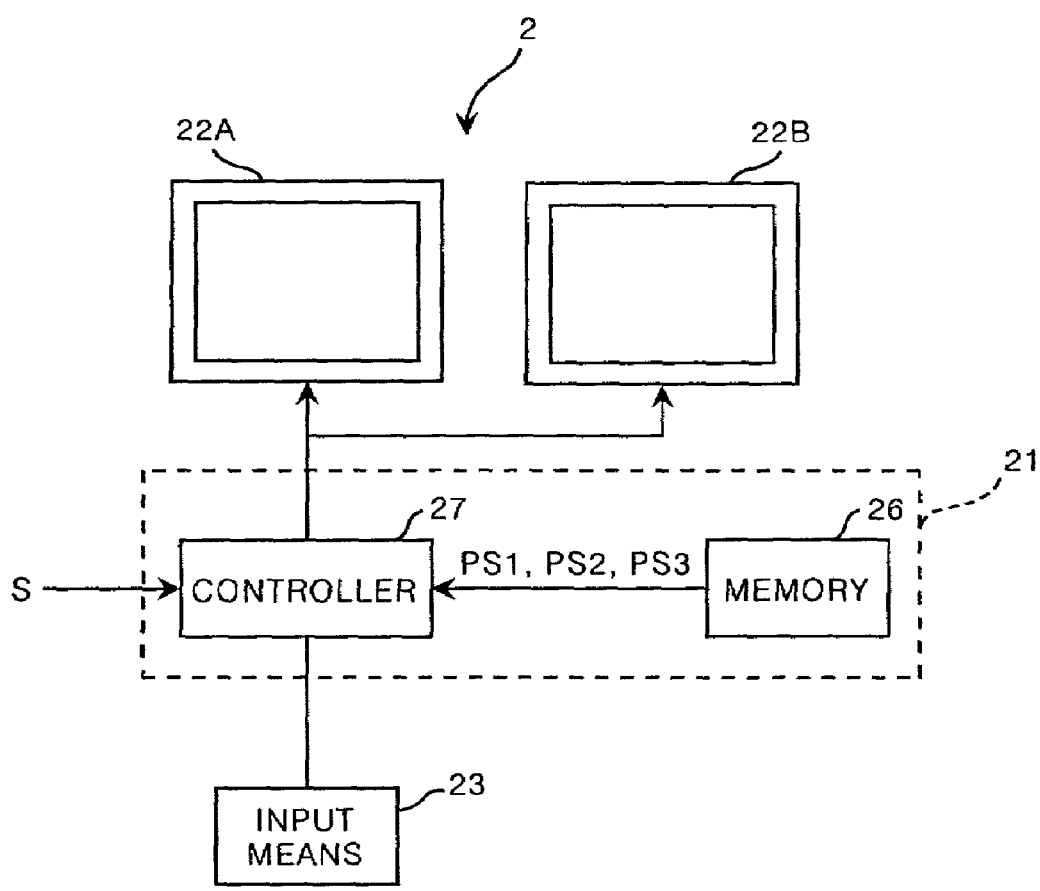
FIG. 2 is a block diagram showing the detailed configuration of a workstation.

Next, the image display method for displaying images on monitor 22 of workstation 2 will be explained. FIG. 2 is a block diagram showing the detailed configuration of a workstation. As shown in FIG. 2, workstation 2 is provided with a controller 27 and a memory 26. Note that in the current embodiment of the two monitors, 22A and 22B are used for displaying images. In addition, controller 27 and memory 26 are provided in FIG. 2 for explanation purposes, however, actual processing is carried out by use of software installed in computer 21. In memory 26, multiple display protocol sequences PS, in which multiple display protocols P defining multiple display layouts are lined up in a predetermined order, are remembered.

FIGS. 3A-C show the display layouts according to each type of display protocol. Note tat in the current embodiment, images obtained by a CT apparatus are displayed. More specifically, in a CT apparatus, two images are taken of the same position: one of the images has shadowed structures, and the other image does not. Generally, there is a set of projection images (called "scout views") composed of a projection image having shadowing and a projection image not having shadowing, and a set of cross-sectional images composed of a cross-sectional image having shadowing and a cross-sectional image not having shadowing, for a total of two sets of images. Each of the two sets of images obtained in this way are grouped so that there is a group containing an image S1 (projection image with shadowing), and an image S2 (cross-sectional image with shadowing), and a group containing an image S3 (projection image without shadowing), and an image S4 (cross-sectional image without shadowing). Here, there is only one image for each projection image; however, each cross-sectional image has 36 images, corresponding to the slice position, which are represented by S2 and S4. Note that images S1-S4 represent images obtained in the current examination.

In addition, the patient subjected to the current examination was subjected to an identical examination a week before (hereinafter referred to as a past examination), and for the past examination, a group of images containing an image O1 (projection image with shadowing), and an image O2 (cross-sectional image with shadowing), and a group containing an image O3 (projection image without shadowing), and an image O4 (cross-sectional image without shadowing) were obtained. The number of images is the same as for S1-S4.

Furthermore, X-ray images of a front view and a side view of the chest of this patient were also obtained.

First, the examining doctor performs a brief examination of the images obtained in the current examination. In this case, as shown in FIG. 3A, the display screen of monitors 22A and 22B are each divided into 9 sections, and are arranged and displayed in a predetermined temporal order. For example, image S2 is displayed first, followed by image S4. Here, images S2 and S4 each have 36 cross-sectional images, however, because only 18 images can be displayed at one time on monitors 22A and 22B, according to a switching operation of input means 23, the displaying of all the images is split into two times and carried out. This type of image protocol is designated as P1.

Next, for cases in which images obtained in a past examination are to be compared to images obtained in the current examination, the display screen of monitors 22A and 22B are each divided into four sections, as shown in FIG. 3B, and each of the images are displayed: in region A1, image S1; in region A2, image S2; in region A3, image O1; in region A4, image O2; in region B1, image S3; in region B2, image S4; in region B3, image O3; and in region B4, image O4. Here, images S1, S3, O1 and O3 have only one image each, but images S2, S4, O2 and O4 each have 36 cross-sectional images, therefore, by employing input means 23, the images are sent in order or in reverse order, according to the number assigned to each image (generally, the slice order, in other words, the order of the slice position), and switched and displayed. Further, a mark for showing what is called the referencing position of the cross-section is displayed in images S1, S3, O1, and O3. In this way, it is possible to see which position of the cross-sectional positions of images S2, S4, O2 and O4 is currently being displayed. This type of display layout is called a stack display, and by displaying such a stack display it is possible to compare image S2 to image O2, and image S4 to image O4; that is to say, comparing the images obtained in the past examination to the images obtained in the current examination is easy to perform. In addition, if switching of the images of the past examination and images of the present examination is carried out at the same time, by switching only the images on one side, because the images on the other side are also sent in order, it is easy to compare the images on both sides. This type of image protocol is designated as P2.

Next, as shown in FIG. 3C, when comparing the CT images and the chest X-ray images, the display screen of monitor 22A is divided into four sections, and the display screen of monitor 22B is divided into 2 sections and each image is displayed: on monitor 22A, in region A1, image S1; in region A2, image S2; in region A3, image S3; in region A4, image S4; and on monitor 22B, in region B1, the front view chest X-ray image; in region B2, the side view chest X-ray image. This type of image protocol is disignated as P3.

Figure 4:
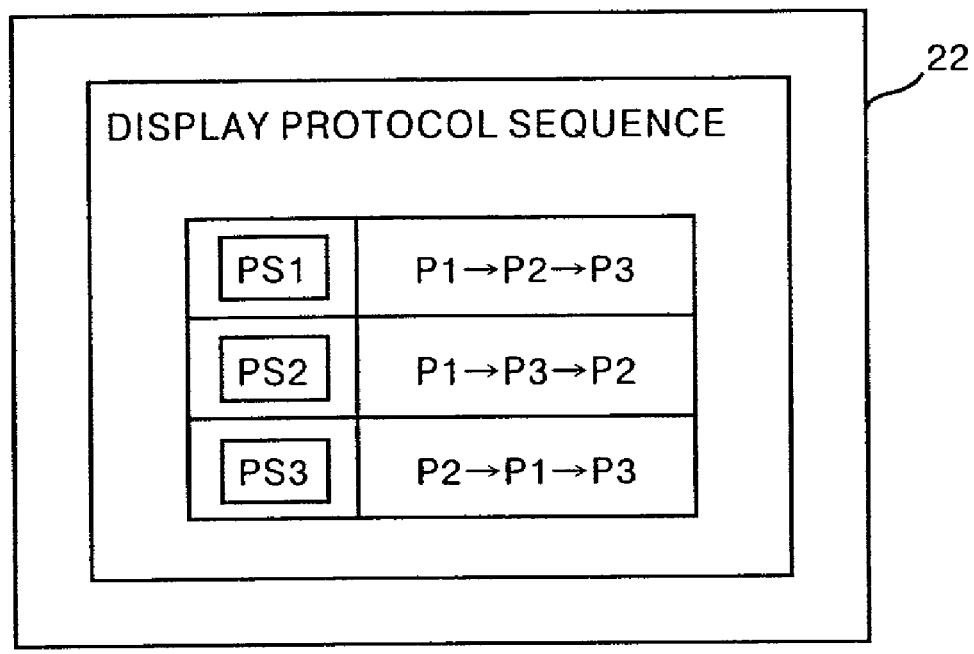
FIG. 4 shows the display protocol sequence selection screen.

Note that for such display protocol sequences PS, there is a selection screen displayed on monitors 22A and 22B as shown In FIG. 4, from which it is possible to select by clicking with the mouse, a desired display protocol sequence PS. Further, at this time, it is beneficial that the display protocol sequence be selected corresponding to the examination, the series, the type of input modality 4 in which the images were formed (CR images, CT images, MRI images, etc.), the examining doctor or group of doctors to which the examining doctor belongs (reading doctor, clinical doctor, referring doctor, etc.) the place where the images are to be employed (an examination room, a doctor's residence, etc.), the purpose for which the images are to be used, (reading, reference, comparison, etc.), etc.

Then, by selecting the display protocol sequence from these types of display protocol sequences, controller 27 displays images on monitors 22A and 22B in the layout corresponding to the order of the display protocols in the selected display protocol sequence. That is, for PS1, display protocol P1 is first, followed by P2, which is then followed by P3. In other words, the display protocols are lined up and then displayed in a temporal manner.

Figure 5:
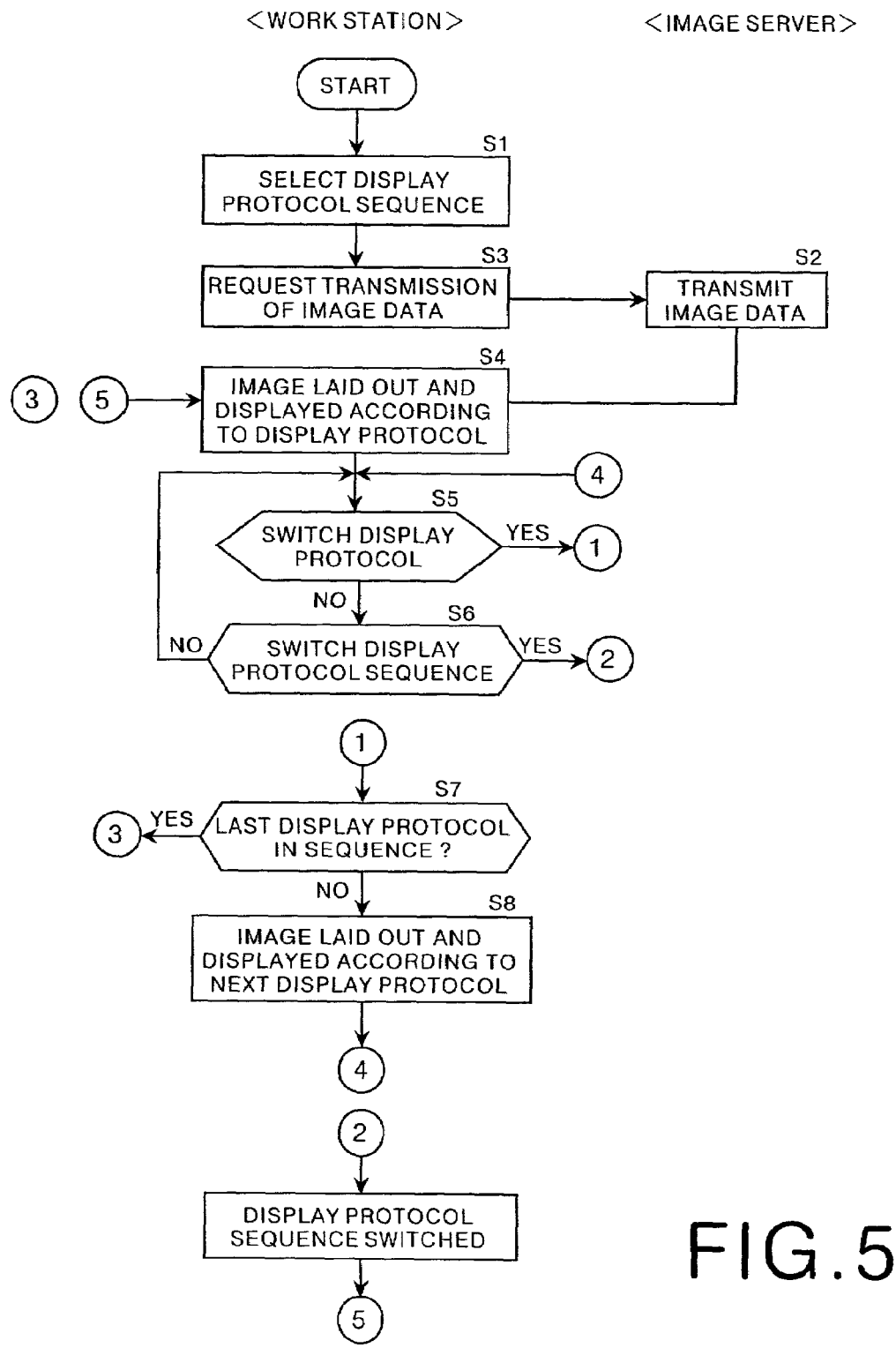
FIG. 5 is a flowchart of the operation of a preferred embodiment.

Next, the operation of the current embodiment will be explained. FIG. 5 is a flowchart of the operation of the current embodiment. First, the doctor who is the examiner of images on of workstation 2, using the input means 23, selects a display protocol sequence for use when images are displayed on monitors 22A and 22B (Step S1), and at the same time specifies that image server 1 transmit the image data S to be displayed (Step S2). Note that in the current embodiment, the display protocol sequence PS1 selected is to be PS1. Accordingly, image data S is transmitted by image server 1 over network 3 to workstation 2 (Step S3). When controller 27 receives transmission of image data S, the selected display protocol sequence is read out from memory 28, and at first, based on to the first display protocol P1, the layout is performed and the laid out images are displayed on monitors 22A and 22B.

Next, by pressing a function key, clicking on the screen with the mouse, etc., a check is conducted (Step S5) to determine whether or not switching of the display protocol sequence has been specified, and if a yes is registered in Step S5, a check to determine whether or not the current display protocol displaying the images is the last display protocol, P3, of the selected display protocol sequence PS1 (Step S7). If a no is registered in Step S7, layout is performed using the next display protocol in order after P1, that is P2, and the images of the next layout are displayed on monitors 22A and 22B (Step S8), and Step S5 is returned to.

Further, when the display protocol sequence is switched, layout is performed using the next display protocol, P3, and the images of the next layout are displayed on monitors 22A and 22B.

On the one hand, if a no is registered in Step S5, a check is conducted to determine whether or not switching of the display protocol sequence has been specified (Step S6), and if a yes is registered in Step S6, the display protocol sequence is switched from the display protocol sequence selected in Step S1, PS1, to the specified display protocol sequence (PS2, for example), and Step 4 is returned to, layout is performed using the first display protocol of the switched to display protocol sequence, and the images displayed. Note that if a no is registered in Step S6, Step S5 is returned to and Steps S5 and S6 are repeated.

In addition, if a yes is registered in Step S7, Step 4 is returned to and the images are laid out according to the first display protocol P1 and displayed. In this way, each time switching of the display protocol is performed, the display protocols are switched in the order P1, P2, P3, P1, etc., and the images laid out and displayed on monitors 22A and 22B.

In this way, because in the current embodiment, based on display protocol sequence PS1, in which the plurality of display protocols P1, P2, and P3 are lined up in a predetermined order, the display format can be switched, the examiner of images at workstation 2, by performing only the simple operation of switching the display protocols in a simply defined sequence, can switch the display layout of images displayed on monitors 22A and 22B. Accordingly, the examiner of images does not have to memorize the display protocols, and his or her workload is thereby reduced.

Further, for cases in which there are multiple display protocol sequences, because the display protocol sequence can be switched, the examiner of images can display the plurality of images according to a desired display protocol sequence.

Note that in the current embodiment, as shown in FIG. 3, the display layout of the images is switched using display protocols that define display layouts, however; display protocols may be defined for each type and level of multiple image processing processes, and the image display format changed according to display protocol sequences in which the multiple display protocols are lined up. For example, by using a display protocol sequence in which various display protocols for changing the intensity-level processing are lined up in a predetermined order, images having different intensity levels can be switched in order and displayed.

Further, in the current embodiment, the display protocols are switched by specifying the switching, it is also possible, for example, that display protocols be switched every so many seconds, etc., or automatically.

In addition, although in the current embodiment the display protocol sequence is selected in advance, the display sequence may also be created automatically corresponding to the examination, the series, the type of input modality 4 in which the images were formed (CR images, CT images, MRI images, etc.), the examining doctor or group of doctors to which the examining doctor belongs (reading doctor, clinical doctor, referring doctor, etc.) the place where the images are to be employed (an examination room, a doctor's residence, etc.), the purpose for which the images are to be used, (reading, reference, comparison, etc.), etc. In this case, the display format is switched according to the generated display protocol sequence.

What is claimed is:

1. An image display method for displaying a plurality of images on a display means, wherein;
   based on at least one display protocol sequence that defines an execution order of a plurality of display protocols for the plurality of images, in which a plurality of display protocols that define a display layout of said plurality of images are lined up in a predetermined order, the display layout of said plurality of images is switched by switching said display protocols by the predetermined order defined in the display protocol sequence and said plurality of images are displayed on said display means using the switched display protocol.

2. An image display method according to claim 1, wherein;
   for cases in which there are multiple display protocol sequences, the desired display protocol sequence can be selected, and based on the selected display protocol sequence, said plurality of images are displayed on the display means.

3. An image display method according to claim 2, wherein;
   said plurality of display protocol sequences can be switched, and based on the display protocol sequence switched to, said plurality of images are displayed on the display means.

4. An image display method according to claim 1, 2, or 3, wherein;
   the display protocol sequences are created based on the predetermined conditions, and based on said created display protocol sequence, said plurality of images are displayed on the display means.

5. An image display apparatus for displaying on a display means a plurality of images, comprising:
a memory means for remembering at least one display protocol sequence that defines an execution order of a plurality of display protocols for the plurality of images, in which a plurality of display protocols tat define a display layout of a plurality of images arc lined up in a predetermined order, and
control means which by switching, based on said at least one display protocol sequence, the plurality of display protocols by the predetermined order defined in the display protocol sequence, switches the display layout of a plurality of images and displays said plurality of images on the display means using the switched display protocol.

6. An image display apparatus according to claim 5, further comprising:
input means for receiving selection of the desired display protocol sequence, for cases in which multiple display protocol sequences are remembered in said memory means, wherein;
based on the selected display protocol sequence in said input means, the control means displays on the display means the plurality of images.

7. An image display apparatus according to claim 6, wherein;
the control means can switch the multiple display protocol sequences, and based on the switched to display protocol sequence, said plurality of images is displayed on the display means.

8. An image display apparatus according to claim 5, 6, or 7, wherein;
based on the predetermined conditions, the control means creates the display protocol sequences, and
based on said created display protocol sequence, said plurality of images are displayed on the display means.

9. A computer-accessible storage medium on which a program tat causes a computer to execute the image display method in which a plurality of images are displayed on the display means, wherein;
said program contains a display procedure for, based on at least one display protocol sequence that defines an execution order of a plurality of display protocols for the plurality of images, in which a plurality of display protocols that define a display layout of a plurality of images are lined up in a predetermined order, switching the display layout by switching said display protocols by the predetermined order defined in the display protocol sequence and displaying on the display means the plurality of images using the switched display protocol.

10. A computer-accessible storage medium according to claim 9, further comprising:
a receiving procedure for receiving a selection of the desired display protocol sequence for cases in which there are multiple display protocol sequences, wherein;
based on the selected display protocol sequence, said display procedure displays the plurality of images on the display means.

11. A computer-accessible storage medium according to claim 10, further comprising:
a switching procedure for switching the multiple-display protocol sequences, wherein;
based on the display protocol sequence switched to, said display procedure displays the plurality of images on the display means.

12. A computer-accessible storage medium according to claim 9, 10, or 11, further comprising:
a procedure for creating, based on the predetermined conditions, said display protocol sequences, wherein;
based on the created display protocol sequence, said display procedure displays the plurality of images on the display means.

13. The method of claim 1, wherein said at least one display protocol sequence includes at least two of the plurality of display protocols to be arranged in a predetermined temporal order, said at least two of the plurality of display protocols each individually comprising a predetermined spatially ordered arrangement of images selected from said plurality of images.

14. The apparatus of claim 5, wherein the control means controls at least two of the plurality of display protocols to be arranged in a predetermined temporal order, said at least two of the plurality of display protocols each individually comprising a predetermined spatially ordered arrangement of images selected from said plurality of images.

15. The medium of claim 9, wherein said at least one display protocol sequence includes at least two of the plurality of display protocol to be arranged in a predetermined temporal order, said at least two of the plurality of display protocols each individually comprising a predetermined spatially ordered arrangement of images selected from said plurality of images.

16. The method of claim 2, wherein said display protocol sequence includes at least two of the plurality of display protocols to be arranged in a predetermined temporal order and wherein the display protocol sequence can be switched to a different display protocol sequence prior to reaching a last display protocol of the display protocol sequence.

17. The apparatus of claim 6, wherein the control means controls at least two of the plurality of display protocols to he arranged in a predetermined temporal order and wherein the display protocol sequence can be switched to a different display protocol sequence prior to reaching a last display protocol of the display protocol sequence.

18. The medium of claim 10, wherein said display protocol sequence includes at least two of the plurality of display protocols to be arranged in a predetermined temporal order and wherein the display protocol sequence can be switched to a different display protocol sequence prior to reaching a last display protocol of the display protocol sequence.

19. The method of claim 1, wherein the display protocols are switched automatically based on the display protocol sequence.

20. The apparatus of claim 5, wherein the control means switches the display protocols automatically based on the display protocol sequence.

21. The medium of claim 9, wherein the display protocols are switched automatically based on the display protocol sequence.

22. The image display method of claim 1, wherein the display protocol sequence is only directed to defining a display of images.

23. The image display method of claim 1, wherein the display protocol sequence lines up the display protocols in order of one of an examination type, a series type, and a doctor type.

* * * * *